March 21, 1939. D. L. HAY 2,150,922
APPARATUS AND METHOD FOR DETECTING DEFECTS IN ELECTRICALLY CONDUCTIVE OBJECTS
Filed Sept. 22, 1936 2 Sheets-Sheet 1
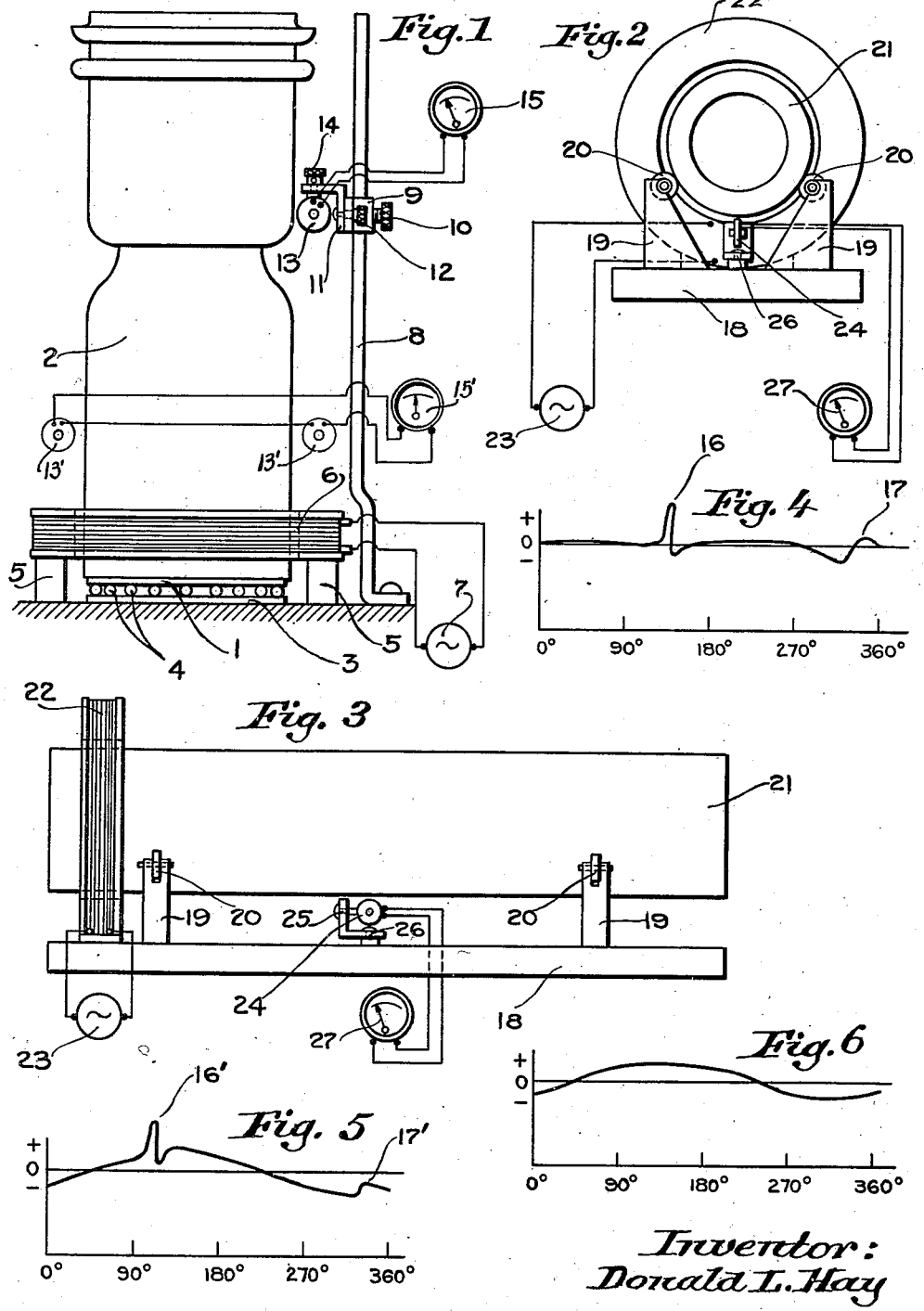
Inventor:
Donald L. Hay
by Robert A. Levender
Attorney March 21, 1939.   D. L. HAY   2,150,922
APPARATUS AND METHOD FOR DETECTING DEFECTS IN ELECTRICALLY CONDUCTIVE OBJECTS
Filed Sept. 22, 1936    2 Sheets-Sheet 2
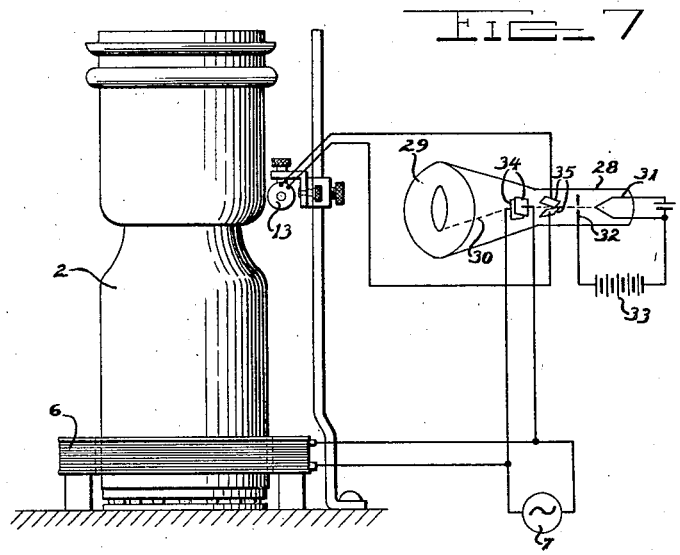
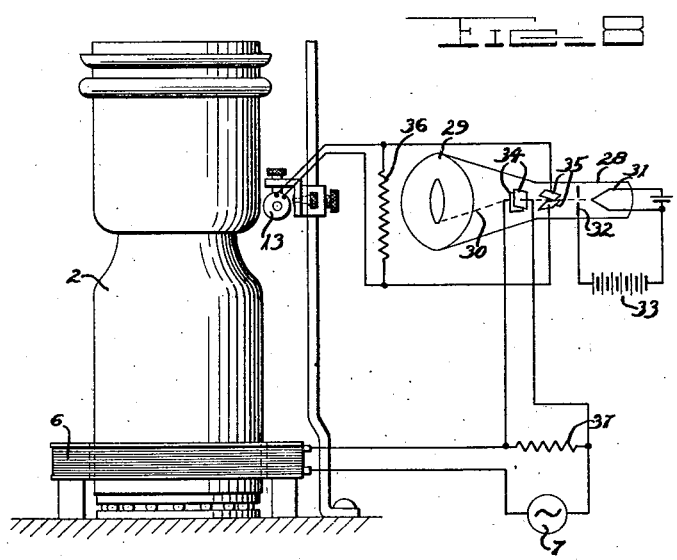
INVENTOR
Donald L. Hay
BY
ATTORNEY Patented Mar. 21, 1939

2,150,922

UNITED STATES PATENT OFFICE 2,150,922

APPARATUS AND METHOD FOR DETECTING DEFECTS IN ELECTRICALLY CONDUCTIVE OBJECTS

Donald L. Hay, Washington, D. C.

Application September 22, 1936, Serial No. 101,978

9 Claims. (Cl. 175—183)

(Granted under the act of March 3, 1883, as amended April 30, 1928; 370 O. G. 757)

My invention relates to an apparatus and method for detecting surface or subsurface defects in magnetic or non-magnetic electrically conductive objects.

It is an object of my invention to provide an electrical testing apparatus which will induce eddy currents in a body or object to be tested and determine the character of the resulting electro-magnetic field whereby to indicate the presence or absence of defects in the body or object under test.

It is another object of my invention to provide an electrical testing apparatus by means of which the approximate depth of a subsurface defect in an electrically conductive body may be ascertained.

It is a further object of my invention to provide an apparatus for the aforementioned purposes which will have a minimum number of parts, be susceptible of being cheaply and easily manufactured, be simple and effective in use, and have a wide field of application in testing both magnetic and non-magnetic electrically conductive bodies, such as castings, forgings, and the like, where destructive tests can neither be economically nor conveniently employed.

My invention, independently of the apparatus, also has for an object the provision of a method for testing magnetic or non-magnetic electrically conductive bodies wherein eddy currents are induced in the body under test and the presence or absence of any defect therein determined by a study of the resulting magnetic field.

My invention also contemplates a method of determining the approximate depth of a subsurface defect in an electrically conductive object by inducing variable frequency eddy currents therein and noting the frequency at which any defect first becomes apparent.

A further object of my invention resides in the provision of a method for detecting defects in magnetic, electrically conductive objects which differs over the first method previously mentioned in that the body under test is also subjected to a strong, constant, magnetic field to thereby reduce the permeability of the test body and increase the exploratory depth.

These and other objects, and many of the attendant advantages, of my invention will be readily appreciated as the same becomes better understood by reference to the following description and drawings wherein:

Fig. 1 shows one embodiment of the electrical testing apparatus which may be conveniently employed for testing objects of relatively short lengths;

Fig. 2 is a view in end elevation of a second embodiment of the electrical testing apparatus which is adapted for use with bodies or objects of extended dimensions;

Fig. 3 is a view in side elevation of this second embodiment;

Fig. 4 shows a characteristic indicator-response curve obtained by rotating a test body having circular symmetry about its axis of symmetry, the test body, except for a crack or fissure therein, being otherwise homogeneous;

Fig. 5 shows the indicator-response curve obtained by rotating a test body having circular symmetry about an axis slightly displaced from the axis of symmetry, the test body, except for a crack or fissure therein, being otherwise homogenous;

Fig. 6 shows the characteristic indicator-response curve obtained by rotating a homogeneous test body having circular symmetry about an axis slightly displaced from the axis of symmetry;

Fig. 7 discloses the precise electrical testing apparatus of Fig. 1, except that the indicating device depicted therein is arranged for showing any variation in phase of the detector coil voltage with respect to the exciting coil voltage; and Fig. 8, likewise, discloses the precise electrical testing apparatus of Fig. 1, except that the indicating device disclosed therein is arranged for showing any variation in phase of the detector coil current or induced magnetic field with respect to the exciting coil current or exciting magnetic field.

Before entering into an extended and detailed description of my invention, it will first be necessary in the interest of clarity to define the term "defect" as it will be used hereinafter and in the claims. The word "defect" implies any inhomogeneity in the body or object under test which will affect its electrical or magnetic properties and any variation in symmetry of a body or object which is presumably perfectly symmetrical. Thus, as illustrative but not restrictive of the scope of the word in question, the following examples are considered defects: Any rupture or break in the electrically conductive material which changes either its electrical resistance or magnetic permeability; any inclusion of material in the object or body under test which has a different electrical conductivity or magnetic permeability; any variation in the conductivity or permeability of the material under test which is not attributable to an inclusion; and any variation in symmetry of a homogeneous body or object which is by form perfectly symmetrical.

My apparatus and method are based upon the induction of eddy currents in the electrically conductive object or body to be tested and the measurement or detection of any distortion in the resultant magnetic field occasioned by the presence of a defect.

In accordance with my invention, I provide a primary, cyclically varying electro-magnetic field for inducing eddy currents in the object to be tested and superimposed the secondary electro-magnetic field generated by the eddy currents upon the primary field to produce in general a resulting, rotating elliptical field. If, now, a homogeneous conductor having axial symmetry is excited by the primary electro-magnetic field parallel to the axis of symmetry, the eddy currents induced therein will be circular in shape and lie in planes perpendicular to the axis. The resulting elliptical field formed under these circumstances will be symmetrical about the axis of symmetry of the conductor and have its plane at all points parallel to and intersecting the axis.

A small coil of wire connected to a current or other indicating device, if placed within the symmetrical elliptical field so that its plane coincides with a radial plane through the axis of symmetry of the conductor, will have no voltage induced therein as is evidenced by the indicating device, since the magnetic field is at all times perpendicular to the axis of the measuring coil. Furthermore, rotation of the test conductor about its axis under the conditions assumed will have no effect for the reason that the elliptical field has circular symmetry.

If, on the other hand, there are any defects in the test conductor, these will cause distortions in the otherwise symmetrical, elliptical magnetic field which manifest themselves principally by slight rotations of the plane of the elliptical field from the radial plane in the vicinity of the defects. These distortions in the otherwise symmetrical, elliptical field or deviations in symmetry therefrom introduce a component of magnetic flux along the axis of the measuring coil with attendant induction of a voltage therein which is indicated in the associated measuring device. Most defects, it is to be noted, will also cause local distortions in the symmetrical pattern of eddy currents induced in a homogeneous conductor having axial symmetry and produce accompanying distortions in the symmetrical elliptical field.

My method and apparatus are not only useful in detecting inhomogeneities in bodies having perfect axial symmetry but may also be used for detecting inhomogeneities in bodies which do not have perfect symmetry if proper allowances are made for any distortions in the resulting field occasioned by the lack of symmetry.

With the foregoing preliminary discussion in view, there is shown in Fig. 1 a freely rotatable bearing plate 1 for mounting the object 2 under test for rotational movement about its vertical axis, the bearing plate being supported on the base plate 3 by means of suitable roller bearings 4. Surrounding the object 2 under test and near its lower extremity, there is mounted on supporting blocks 5, or equivalent means, an exciting coil 6 operable to generate a cyclically varying electro-magnetic field for inducing eddy currents in the object under test, the coil being connected in circuit with and energizable by the variable frequency source of alternating current 7.

An upright rod 8 suitably mounted adjacent the object under test has a sleeve 9 vertically adjustable thereon which can be locked in any desired position of adjustment by means of the lock screw 10. On the sleeve 9 there is rotatably mounted the bracket 11 which is securable in any position of pivotal adjustment by the lock nut 12, the bracket in turn supporting a detector coil 13 for rotatable movement about a vertical axis and adapted to be locked into secure engagement therewith by the lock nut 14. The detector coil 13 is connected to an indicating or measuring device 15 suitable for indicating or measuring the magnitude or phase, or both, of the induced voltage generated by the axial component of magnetic flux through the coil or the current flow incident to the induced voltage. The coil 13 by reason of its adjustable mounting may have its plane set in any desired position and can be adjusted to any desired height.

In operation, the object 2 under test is centered on the bearing plate 1 so that its axis coincides with the axis of rotation of the bearing plate 1 and the exciting coil 6 energized at some selected frequency by the source of alternating current 7 whereby to induce eddy currents in the test specimen. The detector coil 13 is then set at the height at which it is desired to examine the object by manipulations of the sleeve 9 and lock screw 10 and the plane of the coil adjusted by rotation of the same about its two axes of rotation until a position is found where the indicating device shows no response. At this point, the coil is securely clamped in place by means of the lock nuts 12 and 14. The detector coil now has its plane in coincidence with that of the resulting elliptical field.

If the object 2 under test has circular symmetry and is otherwise homogeneous except for the presence of a crack or fissure at the testing level, an indicator-response curve will be obtained, as shown in Fig. 4. As the object 2 is rotated and the crack passes under the detector coil, the indicating device 15 shows a sudden and sharp deflection followed by a reverse deflection as indicated at 16, the point of reversal corresponding very closely to the position of the crack. If the crack is of extended dimensions, the local distortion of the otherwise symmetrical elliptical field may be of such magnitude as to cause a weaker deflection 17 at a point 180° removed from the first deflection 16. The deflection, as previously pointed out, is caused by the axial component of the magnetic flux through the detector coil in consequence of local distortions in the otherwise symmetrical elliptical field occasioned by the presence of an inhomogeneity in the body under test. The initial deflection may be either positive or negative followed by a reversal, the initial direction of deflection depending upon the relation between the plane of the inhomogeneity and the axis of symmetry. Furthermore, it is to be observed that the deflections or indications may take the form of variations in magnitude or phase or both with respect to the voltage applied to the primary exciting coil or the current flowing therein.

Fig. 6 shows the indicator-response curve obtained by rotating a homogeneous test body having circular symmetry about an axis slightly displaced from the axis of symmetry. This curve, as is evident from an inspection of the drawings, is approximately sinusoidal in form and goes through a complete cycle during a single revolution of the test specimen. If, now, in addition to any inaccuracy in centering the object under test, the object also has the defect assumed in discussing the curve of Fig. 4, then, a resultant indicator-response curve (Fig. 5) having corresponding deflections 16' and 17' will be derived by combining the curves of Figs. 4 and 6. From the curve of Fig. 5, it is apparent that deflections due to cracks or other inhomogeneities in the body under test may be distinguished from those due to inaccuracies in centering. Although no curves have been given showing the variation of phase of the detector coil current, voltage or phase of the induced magnetic field with respect to the exciting coil current, voltage or exciting magnetic field, large variations in phase occurred in passing over defects, frequently amounting to 180°, the variations in phase being characteristic of the shape and orientation of the defect. However, the changes are usually more gradual and are more affected by the orientation of the defect with respect to the axis.

For indicating any variation of phase of the detector coil current, voltage or phase of the induced magnetic field with respect to the exciting coil current, voltage or exciting magnetic field, I may employ the conventional cathode ray oscillograph shown in Figs. 7 and 8 of the drawings. The oscillographs as there shown are identical in character and include an envelope 28 which at one end thereof is provided with a fluorescent screen 29 against which the cathode ray stream 30 impinges. At the opposite end of the envelope there are cooperatively disposed a suitably energized thermionic cathode 31 and an apertured anode 32 through which emerges a high velocity beam of electrons by virtue of the accelerating electromotive force 33. Intermediate the screen and anode there are disposed two pairs of spaced parallel plates identified by the reference characters 34 and 35, respectively, the axes of the two pairs being mutually perpendicular. The electron beam 30 in passing to the fluroscent screen 29 at the end of the envelope proceeds along a path between each pair of plates. The pairs of plates electrostatically control the position of the cathode ray beam in space, one pair controlling its horizontal movement and the remaining pair its vertical movement.

If now an alternating voltage is applied to each of the pairs of plates the well known Lissajous figures will be produced on the fluorescent screen since the axes of the electron vibrations are at right angles to each other by virtue of the disposition of the pairs of plates previously noted. If the frequencies of the alternating voltages applied to the pairs of control plates are the same, the observed Lissajous curves will vary from a straight line through an ellipse to a circle and reversely back to a straight line. The change in configuration of the Lissajous figures is due to a change in phase between the alternating voltages impressed upon the deflecting plates, which change may vary from 0 to 180 degrees. Thus, there is provided a convenient means for showing any variation of phase of the detector coil current, voltage or phase of the induced magnetic field with respect to the exciting coil current, voltage or exciting magnetic field, as will be pointed out in greater detail.

Referring now to Fig. 7, the cathode ray oscillograph is shown associated with the detector coil 13 and the source of exciting voltage 7 in a manner for indicating any variation in phase between the detector coil voltage and the exciting coil voltage attending the detection of any defect in the object 2 under test. The pair of deflecting plates 35 as shown is connected directly to the output terminals of the detector coil 13; while the remaining pair of deflecting plates 34 has impressed thereacross the generated voltage of the source of electromotive force 7. It is at once evident from what has been said hereinbefore that any variation in phase between the detector coil voltage and that of the exciting coil attending the detection of a defect will be immediately made apparent by the character of the Lissajous figures appearing on the screen 29 of the cathode ray oscillograph; and that the configuration of the Lissajous figures will have a form varying from a straight line through an ellipse to a circle depending upon the precise phase relation between the voltages applied to the pairs of deflecting plates since the frequencies of the applied voltages are identical.

The arrangement depicted in Fig. 8 is adapted both for showing any variation in phase of the detector coil current or phase of the induced magnetic field with respect to the exciting coil current or exciting magnetic field. For this purpose non-inductive resistors 36 and 37 are connected respectively in parallel with the detector coil 13 and the source of exciting voltage 7. The voltage drop across the non-inductive resistance 37 is at all times in phase with any current flowing in the exciting coil 6. Likewise, the voltage drop across the resistance 36 is in phase with any current that may be induced in the detector coil 13 attending the detection of any defect. Thus it is clear that any variation in phase between the voltage drops across the resistances 36 and 37 will be identical with the phase variations between the currents causing the voltage drops. Since the voltage drops across the resistances 36 and 37 are applied respectively to the pairs of deflecting plates 35 and 34 it follows that the configuration of the Lissajous figures appearing on the screen 29 will show the precise variation of phase between the detector and exciting coil currents consequent upon the detection of a defect in the body 2 under test.

That the arrangement in Fig. 8 is likewise adapted for showing any variation in phase between the exciting magnetic field and that inducing any voltage in the detector coil 13 is believed to be evident. Thus, since the exciting magnetic field is in phase with the current in the exciting coil it follows that the voltage drop across the non-inductive resistance 37 is also in phase with the exciting field. As for the non-inductive resistance 36, any voltage drop thereacross will always have a predetermined phase relation with respect to the resultant or inducing magnetic field associated with the detector coil 13. Thus the voltage drops impressed across the deflecting plates attending the detection of a defect in the body 2 under test will show by the configuration of the Lissajous figures any variation in phase between the exciting and resultant electromagnetic fields.

A cylindrical test specimen having an eccentric cylindrical aperture will give a response curve similar to that shown in Fig. 6. Thus, the apparatus may be used to detect any eccentricity in the bore of a pipe or tubing.

Although a slight displacement of the axis of symmetry of the object 2 under test from the axis of rotation of the bearing plate 1 is not fatal to the operativeness of the apparatus since such a displacement is readily distinguishable from a defect by reason of its regular and singly periodic nature, nevertheless, it may be desirable to eliminate any periodic response of the indicating device when reasonably accurate alignment of the axis of symmetry of the test specimen with the axis of rotation of the bearing plate is either difficult or in practice unattainable. This may be conveniently accomplished by mounting two similar detector or measuring coils 13' (Fig. 1) on opposite ends of a diameter passing through the axis of revolution, the terminals of these coils being connected in circuit with a measuring device 15' in such a manner that the voltages induced therein by displacement of the axes oppose each other. Such an arrangement of parts will, of course, give two indicator deflections for each defect in the specimen under test, the deflections obtained, however, being free from the periodic indication occasioned by the eccentric mounting.

The induced eddy currents have a tendency to concentrate near the surface of the object under test, their magnitude decreasing with increasing depth. Furthermore, the relative depth of eddy current penetration depends upon the actual size of the test specimen, its electrical resistivity, its magnetic permeability, and the frequency of the exciting field, the penetration increasing with increasing electrical resistance, with decreasing magnetic permeability, and with decreasing frequency of excitation.

It is at once evident that the approximate depth of a defect may be determined by making a series of observations within a range of frequencies, it being practical to employ frequencies as high as 1,000 cycles per second where surface defects are to be found and in many instances frequencies of 0.1 cycle per second or lower for penetrating to greater depths. Thus, if, upon rotating the object 2 under test in Fig. 1 through one complete revolution, the indicator 15 shows no deflection, it follows that there are no defects present in the object at a depth equal to the depth of penetration of the eddy currents at the selected frequency of excitation. By assigning to successive rotations of the test specimen excitation frequencies which progressively diminish in magnitude and noting the frequency at which the presence of a defect first makes itself apparent, it is possible to determine the approximate depth of the subsurface defect.

From the foregoing, it is clear that subsurface exploration is most easily accomplished with non-magnetic rather than with magnetic materials unless very low exciting frequencies are employed. In order, however, to avoid the use of inconveniently low frequencies to secure the required subsurface penetration when testing magnetic materials, it may be advantageous to superimpose a strong, substantially constant magnetic field upon the alternating field in order to saturate the material magnetically. The saturation is effective in reducing the magnetic permeability for the alternating component and thereby increasing the depth of eddy current penetration.

Another embodiment of my invention is shown in Figs. 2 and 3 wherein 18 denotes the base of my apparatus having secured thereto a number of uprights 19 carrying rollers 20 for rotatably supporting the test specimen 21. The exciting coil 22 energizable by the variable frequency source of alternating current 23 is rigidly secured to the base 18 as shown and the detector coil 24 may also be conveniently mounted thereon intermediate the uprights 19 for adjustment about the two axes of rotation 25, 26. The indicating or measuring device 27 connected to the detector coil 24 is identical with that of Fig. 1. In use and operation, the embodiment of Figs. 2 and 3 is the same as that of Fig. 1 except that the object 21 under test must be moved axially to bring successive portions thereof adjacent the detector coil 24. The apparatus of Figs. 2 and 3 has a decided advantage over that of Fig. 1 in that a cylindrical test piece placed on the rollers 20 is self-centering, thus effectively eliminating any alignment problem.

Although I have described the use of a solenoid or coil for determining the character of the resulting magnetic field, I do not desire to be limited thereto since any means capable of measuring a magnetic field may be employed. Moreover, if desired, a plurality of detector coils or equivalent means suitably spaced with respect to the test piece may be used in combination with a multiplicity of measuring or indicating devices. Finally, it is to be observed that the detector coil may be moved about or lengthwise of the axis of the test specimen while the specimen itself is held stationary, it being only necessary that the specimen and detector coil be relatively movable.

According to the provisions of the patent statutes, I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention described herein may be manufactured and used by or for the Government of the United States of America for governmental purposes without the payment of any royalties thereon or therefor.

I claim:

1. The method of determining the approximate depth of a defect below the surface of an electrically conductive object which comprises the steps of generating a primary, cyclically varying, electro-magnetic field, inducing eddy currents with said field in the object to be tested, super-imposing the electro-magnetic field produced by said eddy currents on said primary field, varying the frequency of the primary field, measuring any deviation in the symmetry of the resulting electromagnetic field and noting the frequency of the primary field at which any deviation in symmetry first appears whereby the approximate depth of the defect below the surface of the object may be determined.

2. The method of determining the approximate depth of a defect below the surface of a magnetic electrically conductive object which comprises the steps of subjecting the object to a relatively strong and constant magnetic field, generating a primary, cyclically varying electro-magnetic field, inducing eddy currents with said field in the object to be tested, super-imposing the electro-magnetic field produced by said eddy currents on said primary field, varying the frequency of the primary field, measuring any deviation in the symmetry of the resulting electro-magnetic field and noting the frequency of the primary field at which any deviation in symmetry first appears whereby the approximate depth of the defect below the surface of the object may be determined.

3. An apparatus for detecting defects in electrically conductive objects comprising means for supporting the object under test for rotation about a vertical axis, means for inducing eddy currents in the object to be tested and means non-responsive to any asymmetry in the resulting magnetic field occasioned by a displacement of the axis of symmetry of the object with the respect to its axis of rotation but responsive to any asymmetry therein occasioned by any other defect, said last mentioned means comprising a pair of diametrically positioned coils connected in series opposition and in circuit with a suitable indicating device.

4. The method of detecting defects in electrically conductive objects which comprises the steps of generating a primary, cyclically varying, electro-magnetic field, inducing eddy currents with said field in the object to be tested, super-imposing the electro-magnetic field produced by said eddy currents on said primary field to produce a resultant electro-magnetic field, and ascertaining the nature of the object under test by noting the phase relation between the resultant and primary fields.

5. The method of detecting defects in electrically conductive objects which comprises the steps of generating a primary, cyclically varying current to produce a primary, cyclically varying electro-magnetic field, inducing eddy currents with said field in the object to be tested, super-imposing the electro-magnetic field produced by said eddy currents on said primary field to produce a resultant electro-magnetic field, and ascertaining the nature of the object under test by noting the phase relation between the primary current and any current which may be produced by the resultant electro-magnetic field.

6. The method of detecting defects in electrically conductive objects which comprises the steps of generating a primary, cyclically varying voltage to produce a primary, cyclically varying current with its attendant primary, cyclically varying, electro-magnetic field, inducing eddy currents with said field in the object to be tested, super-imposing the electro-magnetic field produced by said eddy currents on said primary field to produce a resultant electro-magnetic field, and ascertaining the nature of the object under test by noting the phase relation between the primary voltage and any voltage which may be produced by the resultant electro-magnetic field.

7. The method of detecting defects in electrically conductive objects which comprises the steps of generating a primary, cyclically varying voltage to produce a primary cyclically varying current with its attendant primary, cyclically varying, electro-magnetic field, inducing eddy currents with said field in the object to be tested, super-imposing the electro-magnetic field produced by said eddy currents on said primary field to produce a resultant electro-magnetic field, and ascertaining the nature of the object under test by noting the phase relation between the primary field, current or voltage on the one hand and the resultant electro-magnetic field or any current or voltage which may be produced by the resultant electro-magnetic field on the other hand.

8. The method of determining the approximate depth of a defect below the surface of an electrically conductive object which comprises the steps of generating a primary, varying, electro-magnetic field, inducing eddy currents with said field in the object to be tested, varying the frequency of the primary field and noting the frequency of the primary field at which any defect is first rendered apparent, whereby the approximate depth of the defect below the surface of the object may be determined.

9. The method of detecting the approximate depth of a defect below the surface of a magnetic, electrically conductive object which comprises the steps of reducing the magnetic permeability of the object under test to increase the exploratory depth, generating a primary, varying electro-magnetic field, inducing eddy currents with said field in the object to be tested, varying the frequency of the primary field, and noting the frequency of the primary field at which any defect is first rendered apparent whereby the approximate depth of the defect below the surface of the object may be determined.

DONALD L. HAY.